(12) United States Patent
Chueh et al.

(10) Patent No.: US 10,036,093 B2
(45) Date of Patent: Jul. 31, 2018

(54) HETEROJUNCTION ELEVATED-TEMPERATURE PHOTOELECTROCHEMICAL CELL

(71) Applicant: The Board of Trustees of the Leland Stanford Junior University, Palo Alto, CA (US)

(72) Inventors: William C. Chueh, Stanford, CA (US); Nicholas Alexander Melosh, Menlo Park, CA (US); Xiaofei Ye, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 550 days.

(21) Appl. No.: 14/464,388

(22) Filed: Aug. 20, 2014

(65) Prior Publication Data
US 2015/0053568 A1 Feb. 26, 2015

Related U.S. Application Data

(60) Provisional application No. 61/867,822, filed on Aug. 20, 2013.

(51) Int. Cl.
*C25B 1/00* (2006.01)
*C25B 1/04* (2006.01)
(Continued)

(52) U.S. Cl.
CPC ............ *C25B 1/003* (2013.01); *C01B 3/042* (2013.01); *C01B 13/0207* (2013.01); *C25B 1/04* (2013.01);
(Continued)

(58) Field of Classification Search
CPC ......... C25B 1/003; C25B 1/04; Y02E 60/366; Y02E 60/364; Y02P 20/135; C01B 13/0207; C01B 3/042
(Continued)

(56) References Cited

U.S. PATENT DOCUMENTS 8,388,818 B1 * 3/2013 Menezes ............... C25B 1/003
    205/340
8,758,949 B2 * 6/2014 Pal ........................... C01B 3/50
    204/250
(Continued)

*Primary Examiner* — Ibrahime A Abraham
*Assistant Examiner* — Colleen M Raphael
(74) *Attorney, Agent, or Firm* — Kaplan Breyer Schwarz, LLP

(57) ABSTRACT

A solid-state PEC includes mixed ionic and electronic conducting oxides that allow it to operate at temperatures significantly above ambient utilizing both the light and thermal energy available from concentrated sunlight to dissociate water vapor. The solid-state PEC has a semiconductor light absorber coated with a thin MIEC oxide for improved catalytic activity, electrochemical stability and ionic conduction, which is located between the gas phase and the semiconductor light absorber. As a result, the MIEC oxide provides a facile path for minority carriers to reach the water vapor as well as a path for the ionic carriers to reach the solid electrolyte. Elevated temperature operation allows reasonable band misalignments at the interfaces to be overcome, reduces the required overpotential, and facilitates rapid product diffusion away from the surface.

20 Claims, 10 Drawing Sheets

(51) Int. Cl.
*C01B 3/04* (2006.01)
*C01B 13/02* (2006.01)

(52) U.S. Cl.
CPC ........... *Y02E 60/364* (2013.01); *Y02E 60/366* (2013.01); *Y02P 20/135* (2015.11)

(58) Field of Classification Search
USPC ....................................................... 205/340
See application file for complete search history.

(56) References Cited

U.S. PATENT DOCUMENTS

| | | | |
|---|---|---|---|
| 2005/0059186 A1* | 3/2005 | Kelly ................... | C25B 1/003 |
| | | | 204/242 |
| 2010/0282601 A1* | 11/2010 | Nomura ................ | C25B 1/003 |
| | | | 204/242 |
| 2012/0028141 A1* | 2/2012 | Nomura ................ | C25B 1/003 |
| | | | 429/422 |
| 2012/0267234 A1* | 10/2012 | Reece ................... | B01J 19/127 |
| | | | 204/157.5 |
| 2013/0168228 A1* | 7/2013 | Ozin ..................... | B01J 35/004 |
| | | | 204/157.15 |
| 2015/0167179 A1* | 6/2015 | Fleig ..................... | C25B 1/003 |
| | | | 205/340 |

* cited by examiner

FIG. 2

Table 1: Default simulation parameters

| Parameter | Symbol | Value | Unit |
|---|---|---|---|
| Solar concentration | | 200 | suns |
| Band-gap | $E_g$ | 2.0 | eV |
| Dopant concentration | $N_a$ | $10^{19}$ | cm$^{-3}$ |
| Thermionic emission pre-factor | $S_0$ | $10^7$ | cm s$^{-1}$ |
| Surface recombination velocity | $S_{sw}$ | $10^4$ | cm s$^{-1}$ |
| Conduction band offset | $\Delta E_C$ | 0.3 | eV |
| Stagnation gas layer thickness | $l$ | 0.5 | mm |
| Molar flux of supplied steam | $q J^a_{H_2O}/F$ | 1.5 | mol s$^{-1}$ m$^{-2}$ |
| Supplied steam partial pressure at cathode* | $p^a_{H_2O}$ | 1 | atm |
| Oxygen impurity partial pressure in the steam | $p^a_{O_2}$ | $10^{-4}$ | atm |
| Oxygen partial pressure at anode | $p^{anode}_{O_2}$ | 0.21 | atm |

* The energy penalty of boiling water is included in the efficiency calculation.

HETEROJUNCTION ELEVATED-TEMPERATURE PHOTOELECTROCHEMICAL CELL

RELATED APPLICATIONS

This application claims the benefit of U.S. Provisional Application No. 61/867,822 filed Aug. 20, 2013. The entire disclosure of U.S. Provisional Application No. 61/867,822 is incorporated herein by reference.

FIELD OF THE INVENTION

The present invention relates to alternative energy production systems in general, and, more particularly, to photoelectrochemical cells.

BACKGROUND OF THE INVENTION

One of the most critical bottlenecks for increasing solar energy utilization is overcoming the inherent intermittency of solar radiation. Converting solar energy into high density chemical energy such as hydrogen is an effective way to address this challenge. In particular, dissociating water with sunlight-driven photoelectrochemical cells (PECs) has received enormous attention. The key challenge for PECs is identifying a combination of materials that absorb the visible solar spectrum, minimize overpotential losses, achieve proper energetic alignment between the light absorber and the electrochemical redox levels, and exhibit excellent stability.

Thus far no one materials system has proven ideal for these stringent requirements, though recent progress is being made on systems such as Si, $Fe_2O_3$, $Cu_2O$, etc. One solution is a heterojunction PEC which couples an efficient solar absorber in the 1-1.6 eV band-gap range with an efficient and robust catalytic layer, typically an oxide with a much larger band-gap. In the prior art, heterojunctions including Si—$TiO_2$ Si—$Fe_2O_3$, $WO_3$—$Fe_2O_3$, $WO_3$—$BiVO_4$ and $Cu_2O$—$TiO_2$ have been explored; however, they have had limited success at room temperature.

While heterojunctions improve harvesting of the solar spectrum, even a small uphill barrier at the interface can severely impede electron transfer and substantially increase the rate of carrier recombination. Moreover, the considerable overpotential required to drive the reaction at a rate matching the solar flux leads to significant losses. Even a state-of-the-art oxygen-evolution catalyst such as $RuO_2$ requires a 200 mV overpotential at a 10 mA $cm^{-2}$ current density.

An alternate approach to fully harvest the solar spectrum is to forgo semiconductor photo-excitation, and instead convert concentrated solar energy into heat. In thermochemical decomposition of steam, thermal energy rather than electrical energy assists chemical reactions involving energetic barriers. Remarkable reaction kinetics has been reported as a result of the high operating temperature, typically from 1,300 to 1,600° C. However, operating at this temperature range requires specialized solar reactors lined with refractory material and precision solar concentrators (typically at concentration exceeding 1,000 suns, where 1 suns is 1 kW $m^{-2}$), dramatically increasing the cost. Other approaches aim to separate the thermal and electrical reactions to multiple devices. For example, Licht, et al., proposed to utilize electricity from multi-junction solar cells and heat from unabsorbed concentrated sunlight to drive a high-temperature electrolyzer in *Int. J. Hydrogen Energy*, Vol. 30, pp. 459-470 (2005), *Advanced Materials*, Vol. 23, pp. 5592-5612 (2011), *Int. J. Hydrogen Energy*, Vol. 35, pp. 10867-10882 (2010), and *J. Phys. Chem.*, Vol. 113, pp. 16283-16292 (2009). Another approach combining a photochemical reactor with thermochemical cycles was also proposed by T-Raissi et al., in *J. Sol. Energy Eng.*, Vol. 129, pp. 184-189 (2007). However, the system complexity of the multi-device, multi-step fuel production cycles may ultimately limit their scalability.

SUMMARY

The present disclosure describes a new class of solid-state PECs based on a heterojunction between a semiconductor light absorber and a mixed ionic and electronic conducting (MIEC) oxide. This integrated photo-thermochemical device captures both thermal and photon energy from concentrated sunlight at temperatures between 673 and 973 K, which could improve carrier transport and electro-catalysis. Unlike thermochemical and hybrid cycles, the elevated-temperature PEC is a single-step approach operating isothermally, thereby substantially reducing the system complexity.

There have been several prior-art attempts to optimize the operating temperature of PECs. Most studies found that the peak efficiency is obtained at 60 to 80° C. Beyond this temperature range, the liquid and polymer solid electrolytes are not stable, and rising dark current with temperature causes the efficiency to approach zero rapidly.

Unfortunately, these limitations restrict the PEC temperature to near ambient. Thus, the significant benefit of faster kinetics and lower water dissociation free energy cannot be fully realized. In the present disclosure, liquid or polymeric solid electrolyte used in conventional PECs is replaced with a solid ionic conductor. As a result, the operating temperature can be extended to a significantly higher range. Many MIECs, e.g. proton- and oxygen-ion-conducting oxides such as doped $BaZrO_3$, $CeO_2$, and various perovskite oxides, have been studied extensively and proven to exhibit excellent conductivity, electro-catalytic activity and thermal stability.

A temperature-dependent model demonstrates that the solar-to-hydrogen efficiency of the proposed light absorber/MIEC heterojunction plateaus at temperatures far above ambient. This result contrasts sharply with the conventional view that photovoltaic-based processes decrease with temperature. The simulation reveals that the solar-to-hydrogen efficiency reaches a maximum of 17% at 723 K for a light absorber with a band-gap of 2.0 eV. These practical efficiencies, calculated using material properties for non-precious electro-catalysts and a single-junction light absorber, demonstrate the advantage of combining thermal and photon energy for the dissociation of water to hydrogen.

In various embodiments, the PEC of the present disclosure comprises: a semiconductor light absorber; and a mixed ionic and electronic conducting (MIEC) oxide disposed over the semiconductor light absorber; wherein the MIEC oxide and the semiconductor light absorber define a heterojunction.

In some embodiments the MIEC oxide comprises an n-type layer or film.

In some embodiments the semiconductor light absorber comprises p-type layer or film.

In some embodiments the heterojunction forms a photocathode.

In some embodiments the photocathode is oxygen-ion-conducting.

In some embodiments the PEC further comprises an anode and an electrolyte disposed between the photocathode and the anode.

In some embodiments the heterojunction forms a photoanode.

In some embodiments the photoanode is proton-conducting.

In some embodiments the MIEC oxide comprises a material selected from the group consisting of $BaZrO_3$, $CeO_2$, and perovskite oxides.

In some embodiments the MIEC oxide comprises Sm-doped $CeO_2$.

In some embodiments the MIEC oxide is operative as an ionic conductor.

In some embodiments the heterojunction defined by the MIEC oxide and the semiconductor light absorber enables PEC operation at temperatures within the range of approximately 673 K to approximately 973 K.

In some embodiments the semiconductor light absorber has band-gap between approximately 1.7 and approximately 2.2 eV.

In some embodiments the semiconductor light absorber has a band-gap of approximately 2.0 eV.

In some embodiments the semiconductor light absorber has an uphill band offset of approximately 0.3 eV.

In some embodiments the MIEC oxide has a band-gap of at least 3.5 eV.

Also described is a method for dissociating water comprising: providing a PEC comprising a photocathode formed by an MIEC oxide, a semiconductor light absorber, and an anode; locating the PEC in a gas environment such that (1) the MIEC oxide and gas environment collectively define an MIEC oxide/gas interface and (2) the anode and gas environment collectively define an anode/gas interface; absorbing photons with the semiconductor light absorber; generating electrons and holes with the semiconductor light absorber in response to the photons, the electrons emitting into the MIEC oxide and the holes migrating to the anode; combining the electrons with water molecules at the MIEC oxide/gas interface to generate hydrogen molecules and oxygen ions; and reacting the oxygen ions with the holes at the anode/gas interface to produce oxygen molecules.

In some embodiments the hydrogen molecules diffuse away from the MIEC/gas interface.

In some embodiments the MIEC oxide provides a path for the oxygen ions, to the holes at the anode/gas interface.

In some embodiments the photons have an energy greater than the bandgap of the semiconductor light absorber.

In some embodiments the MIEC oxide provides a path for the electrons, to the MIEC oxide/gas interface.

BRIEF DESCRIPTION OF THE DRAWINGS

FIG. 2 provides a summary of the default parameter values used in the simulation of PEC 100.

DETAILED DESCRIPTION

Figure 1A:
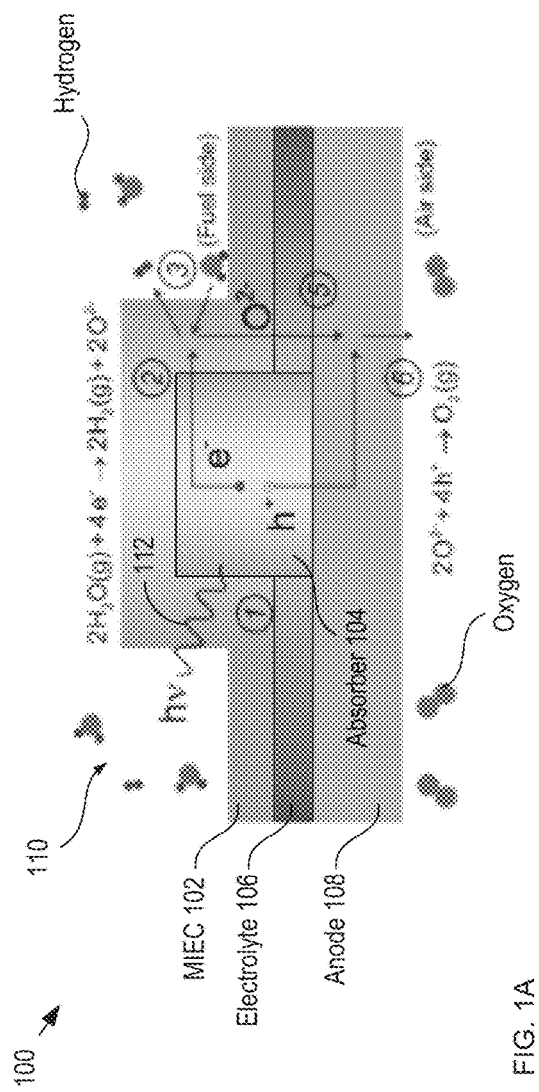
FIG. 1A is a schematic drawing of a PEC in accordance with an illustrative embodiment of the present disclosure.

FIG. 1A is a schematic drawing of a PEC in accordance with an illustrative embodiment of the present disclosure. PEC 100 comprises MIEC 102, light absorber 104, electrolyte 106, and anode 108. PEC 100 is a photocathode-based, oxygen-ion-conducting PEC.

MIEC 102 can comprise an n-type thin-film. In various embodiments, the n-type MIEC thin-film can comprise Sm-doped $CeO_{2-\delta}$ (ceria). In other embodiments, the n-type MIEC thin-film can comprise doped $BaZrO_3$ or a perovskite oxide. The MIEC 102 can be located between light absorber 104 and gas environment 110. MIEC 102 can be a wide band-gap MIEC, which enables most of the solar spectrum to pass through, facilitates (1) selective minority carrier emission from the light absorber to the gas phase molecules, (2) ionic transport to the counter electrode, and (3) passivation of the light absorber against corrosion. In the illustrative embodiment, the thin-film MIEC can have a bandgap greater than 3.5 eV such that 97% of the light passes through. In various other embodiments, MIEC 102 can have a bandgap other than 3.5 eV.

Light absorber 104 can comprise a p-type semiconductor light absorber. In various embodiments, the light absorber 104 can have a band-gap between approximately 1.7 and approximately 2.2 eV. In one non-limiting embodiment, the light absorber 104 can have a band gap of approximately 2.0 eV.

Electrolyte 106 can comprise a conventional membrane-type electrolyte.

Anode 108 can comprise a transition-metal-based perovskite oxide including but not limited to a lanthanum strontium cobaltite or a ferrite.

To better illustrate the physics of a light absorber/MIEC heterojunction PEC, FIG. 1A depicts the stages of the migration of ionic and electronic carriers during water splitting in a photocathode-based, oxygen-ion-conducting PEC.

At stage 1, photons 112 are incident on absorber 104, where photons 112 have energy greater than the absorber band-gap, which excites valence electrons into the conduction band. Excited electrons with energy exceeding that of the absorber band-gap rapidly thermalize and heat up absorber 104. This contrasts sharply with the "hot electron" phenomenon in which non-equilibrium electrons must be harvested in $<10^{-12}$ s. Even if there is a moderate electron barrier at the light absorber/MIEC interface, fully thermalized, excited electrons in absorber 104 can thermionically emit into MIEC 102.

At stage 2, holes are reflected at the hole barrier and migrate to anode 108.

At stage 3, four excited electrons migrate across MIEC 102 and react with adsorbed water molecules (or intermediate species), thereby producing two hydrogen molecules and two oxygen ions at the MIEC/gas interface.

At stage 4, hydrogen gas, rather than potentially trapped as gas bubbles as in conventional liquid-based PECs, rapidly diffuses away from the surface preventing undesirable back reaction.

Simultaneously, at stage 5, two oxygen ions diffuse down MIEC 102 and the membrane (i.e., electrolyte 106).

At stage 6, the oxygen ions react with four holes at the anode/gas interface to generate an oxygen gas molecule, thereby completing the circuit.

In various other embodiments, the PEC of the present disclosure can comprise a photoanode and a proton-conducting MIEC oxide. Compared to conventional solar-cell-powered electrolyzer approaches demonstrated in the prior art, the light absorber/MIEC heterojunction combines carrier excitation, separation and emission to gas-phase reactants into a single heterojunction device.

Based on the stability of oxygen in the ionized state in MIEC 102, oxygen ions can migrate from the MIEC/gas interface without recombining with electrons in the MIEC. Nevertheless, it should be noted that, even if oxygen ions recombined with electrons in the MIEC, the performance of the PEC remains unchanged. The recombination of oxygen vacancies with electrons, unlike the recombination of holes with electrons, is an electrochemical reaction. Therefore, the resulting neutral oxygen vacancy is an energized species which then reacts with steam to produce hydrogen.

An enormous range of high temperature materials has been investigated for solid-oxide fuel cells and electrolyzers (typically working at temperatures >700° C.). These materials are excellent candidates for electrodes, MIECs, and solid electrolytes for PECs in accordance with the present disclosure. For the MIEC, in particular, many ceria-based and ferrite-based materials exhibit sufficiently large band gap (>3 eV) and high electro-catalytic activity. This motivated our selection of ceria as the MIEC in our efficiency simulations. For the anode, transition-metal-based perovskite oxides such as lanthanum strontium cobaltites and ferrites are well-established electrodes for high-temperature fuel cells and electrolyzers. Finally, doped ceria and zirconia are commonly used as electrolyte for oxygen ion conduction. The above materials have excellent thermal and chemical compatibility with each other and are promising candidates for PECs in accordance with the present disclosure. Although less explored, several light absorber materials have been investigated for its high temperature stability. For example, $Fe_2O_3$, $SrTiO_3$, $TiO_2$, with band-gap ranging from 2.0-3.2 eV exhibit excellent stability at elevated temperatures.

The temperature dependence of the solar-to-hydrogen efficiency is non-trivial. While an increase in the thermal voltage ($k_B T$) improves the carrier emission rate across heterojunctions and the electrochemical reaction rate, it also increases the intrinsic carrier concentration which lowers the quasi-Fermi-level splitting in the light absorber. From these competing contributions, it can be expected qualitatively that the solar-to-hydrogen efficiency plateaus at a certain temperature. Below such a temperature, improvement in carrier emission and reaction rates with temperature dominates; above which, rising intrinsic carrier concentration dominates.

Temperature-Dependent Photoelectrode Model

PEC can be described by an analytical model that describes a one-dimensional oxygen-ion-conducting photocathode that emphasizes the coupling of carrier transport across the light absorber/MIEC heterojunction and chemical reactions at the MIEC/gas interface.

Figure 1B:
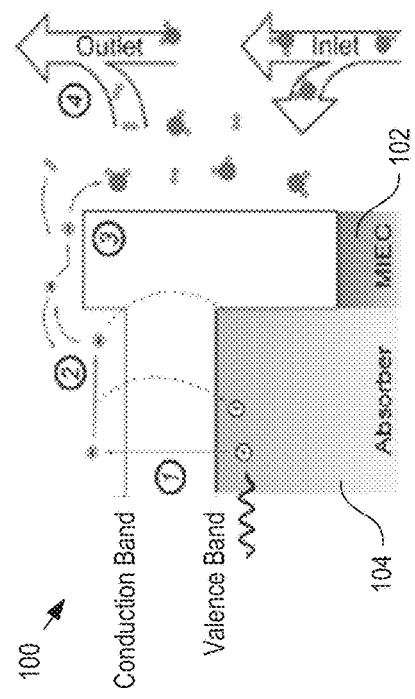
FIG. 1B is a schematic drawing depicting the physical system modeled in accordance with the illustrative embodiment of the present disclosure.

FIG. 1B depicts a schematic depicting the physical system being modeled in accordance with the illustrative embodiment of the present disclosure.

The photocathode comprises a heterojunction formed between a p-type semiconductor light absorber and an n-type MIEC, the latter also in contact with the gas phase. To highlight interfacial effects and to satisfy the one-dimensional approximation (because ions and electrons flow orthogonally) in this geometry, the model assumes that ionic and electronic transport are fast relative to interfacial carrier transport and chemical reactions. For simplicity, all other components of the PEC, namely electrolyte 106 and anode 108, are taken to be reversible (i.e., exhibiting negligible voltage losses). Finally, the model assumes that all incident photons with energy greater than the band-gap are absorbed. As such, the positive dependence of the optical absorption coefficient on temperature (especially for indirect semiconductors) is ignored when calculating the short-circuit current. Concentrated AM1.5G sunlight is used in this calculation.

Current Density at the Absorber/MIEC Interface

The current density at the absorber/MIEC interface is derived using a detailed-balance method. For the loss mechanisms, radiative and surface recombinations in the light absorber are considered, the rate of the latter scales linearly with the excess carrier concentration. This phenomenological description is adopted, rather than the more physical Shockley-Read-Hall mechanism, to minimize the number of unknown parameters in the simulation. Because technologically relevant photoelectrodes are likely nano-structured, it is expected that surface recombination will dominate over bulk recombination mechanisms such as Auger recombination, which is not explicitly considered here. Because the band-gap of MIEC 102 is assumed to be significantly greater than that of absorber 104, photo-generated and thermal-generated carriers within the MIEC are also assumed to be negligible. Moreover, the recombination of non-equilibrium electrons in MIEC 102 is also neglected due to its wide band-gap and the very low hole concentration. Coupling these recombination mechanisms with carrier generation via light absorption, the following flux-conservation equation is obtained:

$$0 = \Gamma_{sun} - \frac{n_{abs} N_a}{n_i^2} \Gamma_{BB} - (n_{abs} - n_{abs}^{dark}) S_{sur} - \frac{J}{q} \quad (1)$$

where $\Gamma_{sun}$ is the photon flux with photon energy above bandgap $E_g$, $n_{abs}$ and $n_{abs}^{dark}$ are the electron concentrations in the light absorber with and without illumination, respectively, $n_i$ is the intrinsic electron concentration in the light absorber, $N_a$ is the dopant concentration in the light absorber, $\Gamma_{BB}$ is the blackbody radiation of the device at equilibrium, $S_{sur}$ is the surface recombination velocity, and q is the electric charge. The hole concentration in the light absorber is taken to be fixed by excess acceptor doping. In Eq. 1, the second term in the rhs represents radiative recombination under illumination and the third term represents surface recombination. The final term, J/q, corresponds to the net electron mass flux across the interface, which can be expressed as a sum of the forward and reverse flux:

$$J/q = n_{abs} S_{forward} - n_{MIEC} S_{reverse} \quad (2)$$

where $S_{forward}$ and $S_{reverse}$ represent the carrier velocity for forward and reverse emission, respectively, and $n_{MIEC}$ is the carrier concentration in the MIEC. Here, emission in the forward direction is defined as from the light absorber to the MIEC. Under open-circuit conditions, $S_{forward}$ and $S_{reverse}$ are related to each other by $n_{abs}$ and $n_{MIEC}$ values at J=0. Eq. 2 describes the situation that once the photo-excited electrons emit across the heterojunction into the MIEC, they could also jump back into the light absorber. Based on the thermionic emission formalism, the forward and reverse carrier emission velocities are thermally activated, such that $S_{forward} = S_0 \exp(-\Delta E_C/\kappa_B T)$, in which $\Delta E_C$ is the conduction band offset between the absorber and MIEC. By recognizing that $n_{abs}^{dark} = n_i^2(T)/N_a$ and combining Eq. 1 and 2, the current density at the absorber/MIEC interface is obtained, $$J = q \left( \Gamma_{sun} + \frac{n_i^2}{N_a} S_{sur} \right) \frac{S_{forward}}{S_{forward} + S_{rec}} - q n_{MIEC} S_{reverse} \left( 1 - \frac{S_{forward}}{S_{forward} + S_{rec}} \right) \quad (3)$$

where the total recombination velocity is defined as the sum of the surface recombination and the blackbody radiative recombination velocities:

$$S_{rec} = S_{sur} + \frac{N_a}{n_i^2(T)} \Gamma_{BB}(T) \quad (4)$$

Eq. 3 provides a simple analytical expression for understanding the carrier generation and recombination processes at the light absorber/MIEC interface. The first combined term in Eq. 3 accounts for the flux of photo-generated electrons ($\Gamma_{sun}$) and thermal-generated electrons at the surface $$\left( \frac{n_i^2}{N_a} S_{sur} \right),$$

which emits in the forward direction with probability $$\frac{S_{forward}}{S_{forward} + S_{rec}}.$$

Electrons not emitted across the heterojunction recombine with holes in the light absorber. On the other hand, electrons could also emit from the MIEC to the light absorber (i.e., in the reverse direction), which is described by the second term of Eq. 3. Of the electrons that emit in the reverse direction at the rate of $n_{MIEC} S_{reverse}$, a fraction of them recombine with holes in the light absorber, and the remaining undergoes further emission into the MIEC.

For computational convenience, space-charge effects are not included. It is assumed that the charge separation is achieved solely through the asymmetric heterojunction. It is an aspect of the present disclosure that including the space-charge model will only further improve the charge separation and lead to even higher solar-to-fuel efficiency.

Current Density at the MIEC/Gas Interface

Once the excited electrons in the light absorber emit into the MIEC, they migrate to the MIEC/gas interface and react with the water vapor molecules (FIG. 1b). Assuming that the MIEC layer is sufficiently thin and the electrons mobile, the rate of electron emission into water molecules is controlled by the electrochemical reaction rate at the MIEC/gas interface. The overall reaction is given as:

$$H_2O(g) + 2e^- + V_O^{2+} \rightarrow H_2(g) \quad (5)$$

where $V_O^{2+}$ is the oxygen vacancy in MIEC. Although the detailed reaction mechanism is not known, it is assumed that the reaction kinetics can be described by the above global reaction. The reaction rate is expressed as a function of gas pressures and the electron and oxygen vacancy concentration in the MIEC:

$$\frac{J}{q} = k_f \tilde{n}_s^2 \tilde{c}_{V_s} \frac{p_{H_2O}^s}{P_0} - k_r \frac{p_{H_2}^s}{P_0} \approx k_f' \tilde{n}_s^2 \frac{p_{H_2O}^s}{P_0} - \frac{p_{H_2}^s}{P_0} \quad (6)$$

where $k_f$ and $k_r$ are the forward and reverse rate constants, respectively, $\tilde{n}_s$ and $\tilde{c}_{V_s}$ are surface electrons and vacancies occupation fractions, $p_{H_2O}^s$ and $p_{H_2}^s$ are the partial pressure immediately above the surface, and $P_0$ is the standard pressure. Here, the electron concentration (i.e., the chemical potential) is used instead of Fermi level (sum of chemical and electrostatic potentials). Electrostatic potential drops at the interface are not explicitly considered because, under the global reaction approximation, oxygen vacancies and electrons are transported as a neutral complex across the interface. Under the typical situation of high extrinsic doping (with an aliovalent dopant), $\tilde{c}_{V_s}$ is approximately constant under conditions applicable to water splitting. In other words, electron transfer across the MIEC/gas interface is taken as rate limiting. By absorbing $\tilde{c}_{V_s}$ into the rate constant, the approximated reaction rate in Eq. 6 is obtained. Furthermore, the boundary condition can be simplified by recognizing that $k_f'$ and $k_r$ are related through equilibrium partial pressure and electron concentration, $$k_f'(\tilde{n}_s^{eq})^2 p_{H_2O}^{in} = k_r p_{H_2}^{in} \quad (7)$$

where $\tilde{n}_s^{eq}$ is the electron occupation fraction when the MIEC is in equilibrium with the supplied gas environment, $p_{H_2O}^{in}$ and $p_{H_2}^{in}$ are the water and hydrogen partial pressures in the inlet gas, respectively (in practice, the latter is negligible). Finally, it should be noted that high oxygen vacancy concentration in most MIECs gives a Debye screening length that is typically less than one nanometer. For simplicity, carrier transport in the space-charge layer is ignored.

It has been shown in the solid-oxide fuel cell that there is a stagnation layer at the electrode surface. The gas composition outside this layer depends on the gas flow rate in the system. At steady state, the electronic current at the MIEC/gas interface matches the hydrogen diffusion rate in the gas phase.

$$\frac{J}{2q} = J_{H_2} = \frac{D_{H_2}}{k_B T} \frac{(p_{H_2}^s - p_{H_2}^{ss})}{l} \quad (8)$$

where $D_{H_2}$ is the mass diffusivity of hydrogen, taken to be independent of hydrogen partial pressure, and l is the thickness of stagnation layer. The hydrogen partial pressure outside the stagnation layer at steady state $p_{H_2}^{ss}$ is determined by the hydrogen flux $J_{H_2}$ (with $$p_{H_2}^{ss} = p_{H_2}^{in} + \left(\frac{J_{H_2}}{J_{H_2O}^{in}}\right) p_{H_2O}^{in}$$

where $J_{H_2O}^{in}$ is the steam flow rate at the inlet). The ratio $$\frac{J_{H_2}}{J_{H_2O}^{in}}$$

is then the water-to-hydrogen conversion rate in the system. An analogous equation can be written for the gas phase diffusion of $H_2O(g)$. Combining Eq. 6-8, the current density at the MIEC/gas interface is obtained.

$$J = qk'_f((\tilde{n}_s)^2 - (\tilde{n}_s^{eq})^2) \quad (9)$$

$$\frac{p_{H_2O}^{in}}{P_0}\left[1 + \frac{k'_f k_B Tl}{2P_0}\left(\frac{(\tilde{n}_s)^2}{\alpha_{H_2O} D_{H_2O}} + \frac{(\tilde{n}_s^{eq})^2}{\alpha_{H_2} D_{H_2}} \frac{p_{H_2O}^{in}}{p_{H_2}^{in}}\right)\right]^{-1}$$

Here the non-dimensionalized parameter $$\alpha_i = \left(1 + \frac{D_i p_{H_2O}^{in}}{k_B Tl * J_{H_2O}^{in}}\right)^{-1}$$

is the measure of competition between gas convection and diffusion, ranging from 0 to 1, for the ith gas species ($H_2$ or $H_2O$ in the present case). The effective mass diffusivity, $\alpha_i D_i$, reflects the coupling between the gas convection rate and diffusion rate through the steady state partial pressure. If the gas flow rate is fast as compared to gas diffusion such that the partial pressure is not perturbed by hydrogen production or water consumption, then $\alpha \rightarrow 1$ and the effective mass diffusivity is simply $D_i$. On the other hand, when the gas flow rate approaches zero, $\alpha \rightarrow 0$ and the gas diffusion is impeded due to a decrease in the pressure gradient near the MIEC surface. Eq. 9 reveals that the efficacy of reactant and product mass transport plays a crucial role in determining the current density.

Overall Current Density and Efficiency of the Solid-State PEC

Under the assumption of fast electron transport and no recombination in the MIEC, Eq. 3 and 9 can be combined directly to give the hydrogen flux of the PEC. The device efficiency is then given by:

$$\eta = \frac{\frac{qJ_{H_2}}{F} \cdot \Delta G_{rxn}^{0,298\,K}}{P_{sun}} \quad (10)$$

where F is the Faraday constant, $\Delta G_{rxn}^{0,298\,K}$ is the standard Gibbs free energy of the water spitting reaction at 298 K (237 kJ mol$^{-1}$), and $P_{sun}$ is the power of the incident solar irradiation.

Energy Balance

The availability of thermal energy resulting from below- and above-bang-gap light absorption sets the temperature of our elevated-temperature PEC. The maximum attainable temperature is determined by considering the total energy balance between concentrated sunlight input, electrical work, and heat flow. In the absence of external energy sinks, the total energy balance is expressed as:

$$P_{sun} = [\sigma T^4 + (e^{\Delta \mu_{abs}/k_B T} - 1)P_{BB}] + \quad (11)$$

$$\frac{J \cdot \Delta \mu_{abs}}{q} + \left[\frac{qJ_{H_2O}^{in}}{F} \cdot \Delta H_{H_2O}^0(T) + \frac{J \cdot T\Delta S_{rxn}}{2q}\right]$$

The first term gives the blackbody radiation (for both equilibrium and excess carriers). The second term gives the electrical work done by the light absorber. Finally, the third term sums the net thermal energy consumed by heating $H_2O$ and by the water-splitting reaction. Here, $\Delta H_{H_2O}^O(T)$ is the enthalpy required to heat/boil water from 298 K to T, and $T\Delta S_{rxn}$, is the reaction entropy for water dissociation at given temperature and partial pressures. Heat recovery, which is not considered in this work, further increases the maximum attainable temperature.

Simulation Parameters

The solar-to-hydrogen efficiency are simulated based on a non-degenerate semiconducting light absorber and a polaron-type, oxygen-ion-conducting MIEC (in which both electron and ion mobilities are thermally-activated). For simplicity, the effective density of states of Si is used. While the effective density of states varies between materials, the effect on the carrier concentration is relatively small compared to the effect of the band-gap, especially at elevated temperatures. For the MIEC, thermodynamic and transport properties of 15% Sm-doped $CeO_{2-\delta}$ (ceria), a common material used in solid-oxide fuel cells and electrolyzers, are used.

To identify material parameters that maximize the efficiency, the band-gap of the light absorber ($E_g$) and the conduction band offset between the light absorber and the MIEC ($\Delta E_C$) are varied. Turning to interfacial properties, the thermionic emission pre-factor ($S_0$) which combines the electron thermal velocity and the reflection coefficient, is selected to be $1\times10^7$ cm s$^{-1}$. Finally in the gas phase, the stagnation gas layer thickness is selected to be 0.5 mm, consistent with values reported for solid-oxide fuel cell anodes.

FIG. 2 provides a summary of the default parameter values used in the simulation of PEC 100. Unless otherwise noted, these values were used in the subsequent simulations.

Figure 3:
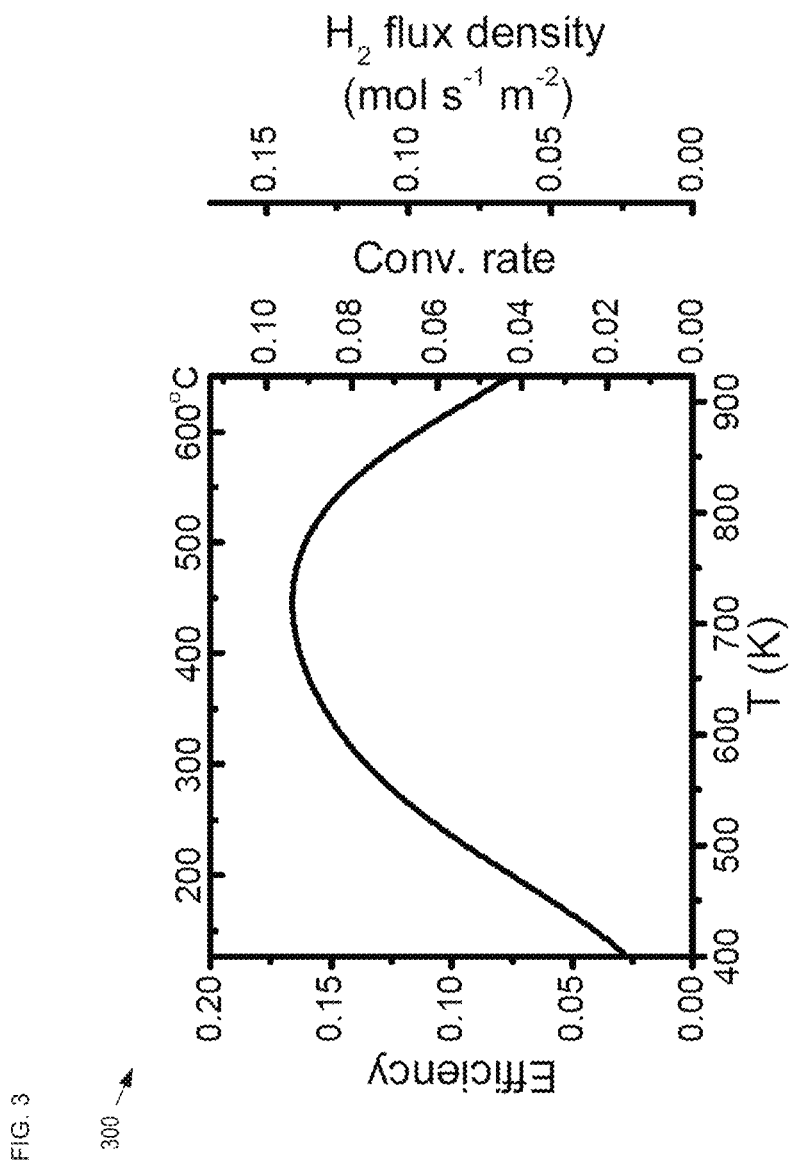
FIG. 3 depicts a plot of PEC operating parameters in accordance with the illustrative embodiment of the present disclosure.

FIG. 3 depicts a plot of PEC operating parameters in accordance with the illustrative embodiment of the present disclosure. Plot 300 displays modelling results for device efficiency, conversion rate, and hydrogen flux density as a function of temperature. It should be noted that the results provided in plot 300 are based on the modelling parameters outlined in FIG. 2.

The efficiency of the semiconductor/MIEC heterojunction photocathode was calculated as a function of temperature. The solar-to-hydrogen efficiency shows a broad maximum at ~750 K. The efficiency, accounting for overpotentials and the energy penalty for boiling water and heating up steam, reaches a respectable value of 17% (which, as shown later, can be increased further by optimizing the material properties). The $H_2O$-to-$H_2$ conversion rate is 9.4%. No heat recovery was assumed.

By calculating the voltage drops within the heterojunction, the trend of the efficiency curve can be calculated.

Figure 4:
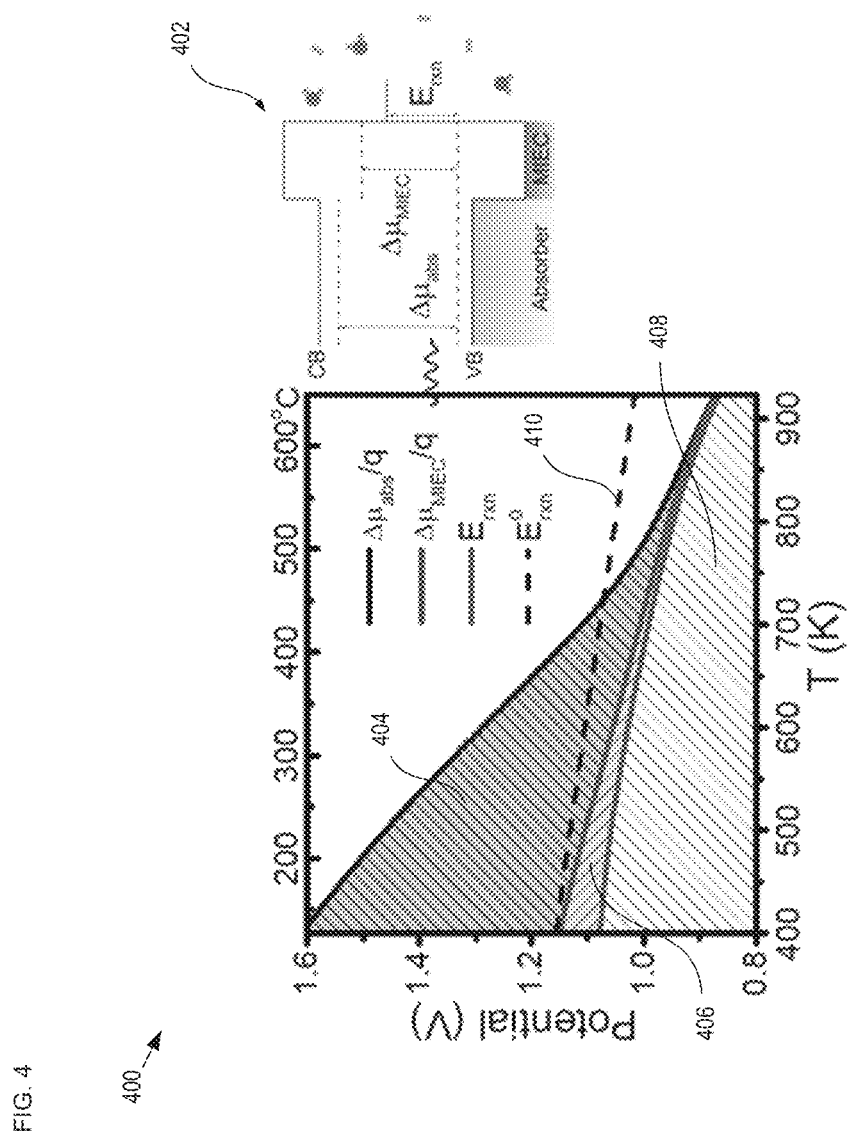
FIG. 4 depicts the voltage drop within the photocathode of a PEC in accordance with the illustrative embodiment of the present disclosure.

FIG. 4 depicts the voltage drop within the photocathode of a PEC in accordance with the illustrative embodiment of the present disclosure. Plot 400 depicts the quasi-Fermi-level splitting in the light absorber and the MIEC, as well as the dynamic redox potential. Inset 402 shows the schematic, non-equilibrium potential distribution in the PEC photocathode.

Upon receiving incident light, the photovoltage $\Delta\mu_{abs}/q$ (splitting of electron and hole quasi-Fermi levels) is established in the light absorber. The voltage decreases across the absorber/MIEC interface in order to drive electrons across the conduction band offset at the heterojunction. The difference between $\Delta\mu_{abs}$ and $\Delta\mu_{MIEC}$ (where $\Delta\mu_{MIEC}$ is the MIEC quasi-Fermi-level splitting), is the overpotential for thermionic emission. Since the electron transport in the MIEC is assumed to be fast, $\Delta\mu_{MIEC}$ is also the electron chemical potential available for dissociating water at the MIEC/gas interface. Based on the surface hydrogen and water vapor partial pressures at steady state, a dynamic redox potential $E_{rxn}$ (accounting for reactant and product pressures at non-standard states) can be calculated, as depicted as region 408 in plot 400.

The difference between $\Delta\mu_{MIEC}/q$ and $E_{rxn}$ is the reaction overpotential. It should be noted that calculations were performed across a wide range of temperature to reveal important trends. At temperatures below 700 K, the fast-ionic- and fast-electronic-transport assumptions in the MIEC might not be realistic.

At temperatures below 700 K, the photovoltage is well in excess of the standard redox potential $E_{rxn}^0$ (~1.1 V), which is shown as curve 410. In this temperature regime, the overpotential at the light absorber/MIEC heterojunction (region 404) dominates.

As the temperature increases, the heterojunction overpotential decreases from ~0.5 V at 400 K to ~0.1 V at 700 K, while the current density increases by more than 5 times. This highlights the importance of thermal energy for accelerating carrier emission across heterojunctions.

As the temperature is increased significantly above 700 K, the light absorber photovoltage falls below the standard redox potential for water splitting. While some hydrogen is still being produced, the flux is suppressed due to an insufficient driving force. This is due to rising intrinsic carrier concentration with temperature, leading to decreased photovoltage in the light absorber. As shown below, the efficiency at higher temperatures can be improved by increasing the dopant concentration. It is also worthwhile to note that the reaction overpotential (region 406) is always below 0.1 V.

Summarizing, at lower temperatures, the solar-to-hydrogen efficiency rises rapidly with temperature due to thermally-assisted carrier emission across the MIEC/light absorber interface; at higher temperatures, the efficiency decreases with temperature due to rising intrinsic carrier concentration and diminishing photovoltage.

From the above, it can be seen that the heterojunction PEC converts the absorbed photons into electrical energy to dissociate water, while thermal energy assists electrons to surmount energetic barriers. Beyond improving kinetics, however, thermal energy also contributes to the total energy stored in hydrogen ($T\Delta S_{rxn}$, where $\Delta S_{rxn}$ is the entropy of the water-splitting reaction). This is evident from the negative temperature dependence of curve 410—the standard redox potential for water dissociation (i.e., the electrical requirement). The standard redox potential decreases from 1.23 V at room temperature to 1.06 V at 750 K. Moreover, thermal energy is also utilized to heat and boil liquid water to steam.

Figure 5:
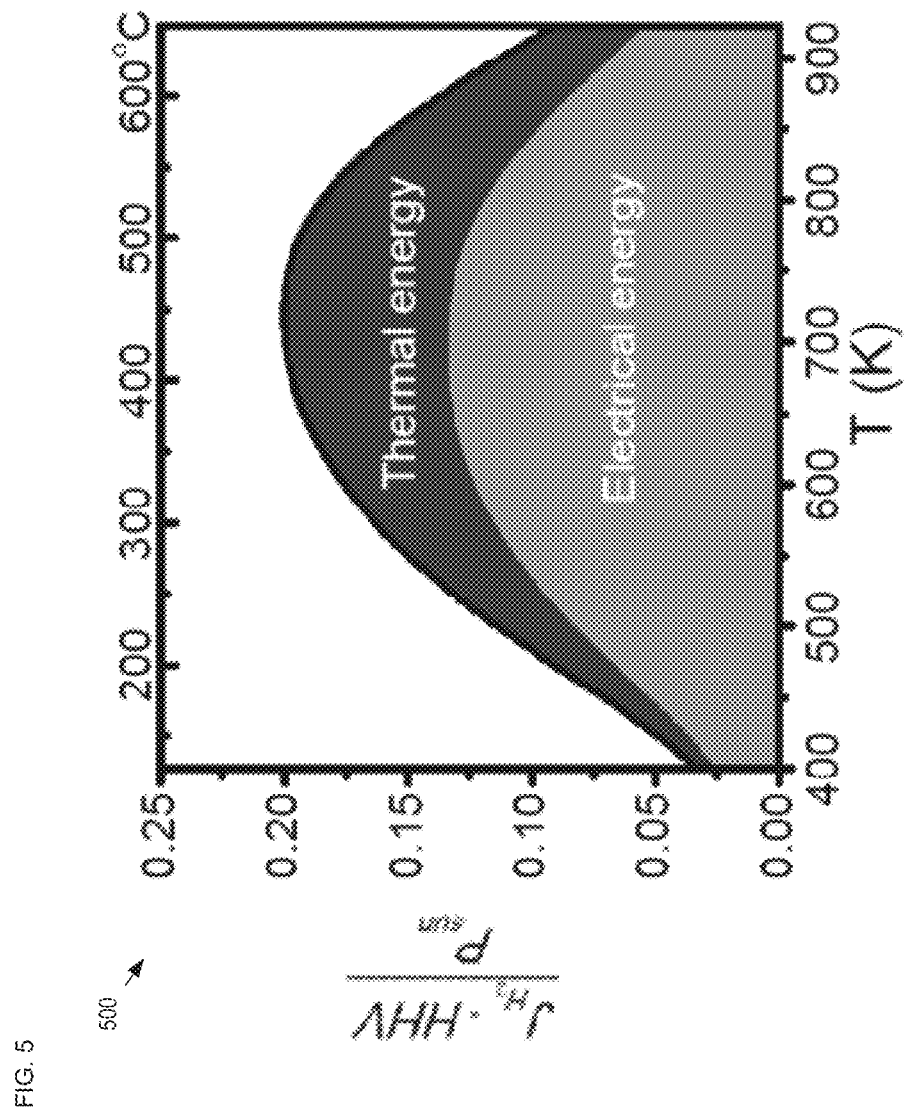
FIG. 5 depicts thermal and electrical contributions to the total free energy stored in $H_2$ for a PEC in accordance with the illustrative embodiment of the present disclosure.

FIG. 5 depicts thermal and electrical contributions to the total free energy stored in $H_2$ for a PEC in accordance with the illustrative embodiment. Plot 500 shows the result of calculations that were performed across a wide range of temperature. Plot 500 evinces some significant trends. At temperatures below 700 K, the fast-ionic- and fast-electronic-transport assumptions in the MIEC may not be realistic. At 750 K, ~35% of the energy required for dissociating water is supplied thermally. At room temperature, the thermal contribution value drops to 17%. These results confirm the significant thermodynamic benefit of dissociating water at elevated temperature, as excess thermal energy from concentrated sunlight, along with photon energy, is transferred efficiently to chemical bonds.

In the simulation the maximum attainable PEC temperature based on the total energy balance (Eq. 11), assuming no heat recovery, is also taken into account. In other words, heat released from cooling steam, $H_2$, and $O_2$ to room temperature is discarded.

Figure 6:
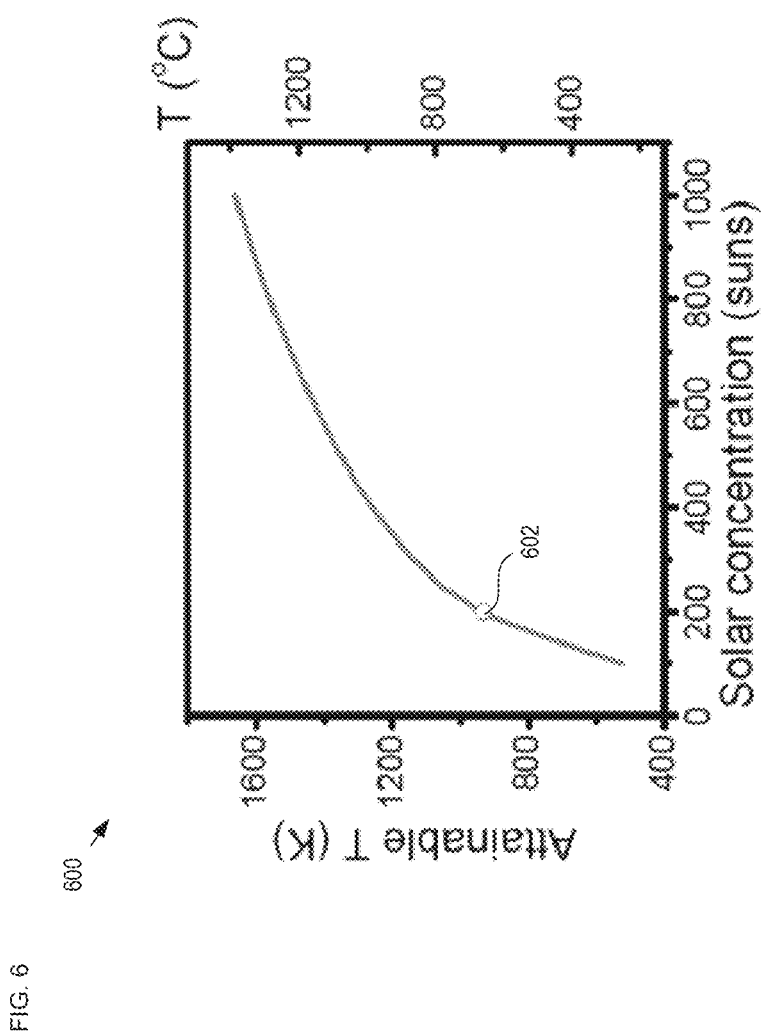
FIG. 6 depicts a plot of the maximum attainable temperature as a function of solar concentration.

FIG. 6 depicts a plot of the maximum attainable temperature as a function of solar concentration. Examination of plot 600 reveals that, at a solar concentration of 200 (the solar concentration used in the simulation and indicated as data point 602), there is sufficient thermal energy to operate the PEC at 900 K. In practice, significant heat recovery can be achieved using a heat exchanger. Examples of heat exchangers suitable for use with the present disclosure include, without limitation, counterflow heat exchanger designs where the heat released from cooling product gases provides the energy to heat up the reactants, which can further increase the attainable temperature.

In addition to the electrical and thermal contributions to photocathode performance, another critical aspect is the gas-phase transport—in particular, the rate at which hydrogen is removed from the MIEC/gas interface. In this simulation, the externally tunable parameter is the water flow rate at the inlet, which, as shown in Eq. 9, sets the effective diffusivity of the gas species. Intuitively, low gas flow rate will lead to accumulation of $H_2$ at the MIEC/gas interface and promote the undesired back reaction, thereby limiting PEC efficiency. On the other hand, at a high water vapor flow rate, most of the thermal energy goes towards heating up water (in the limit of zero heat recovery) and $H_2O$-to-$H_2$ conversion rate is negligible.

Figure 7A:
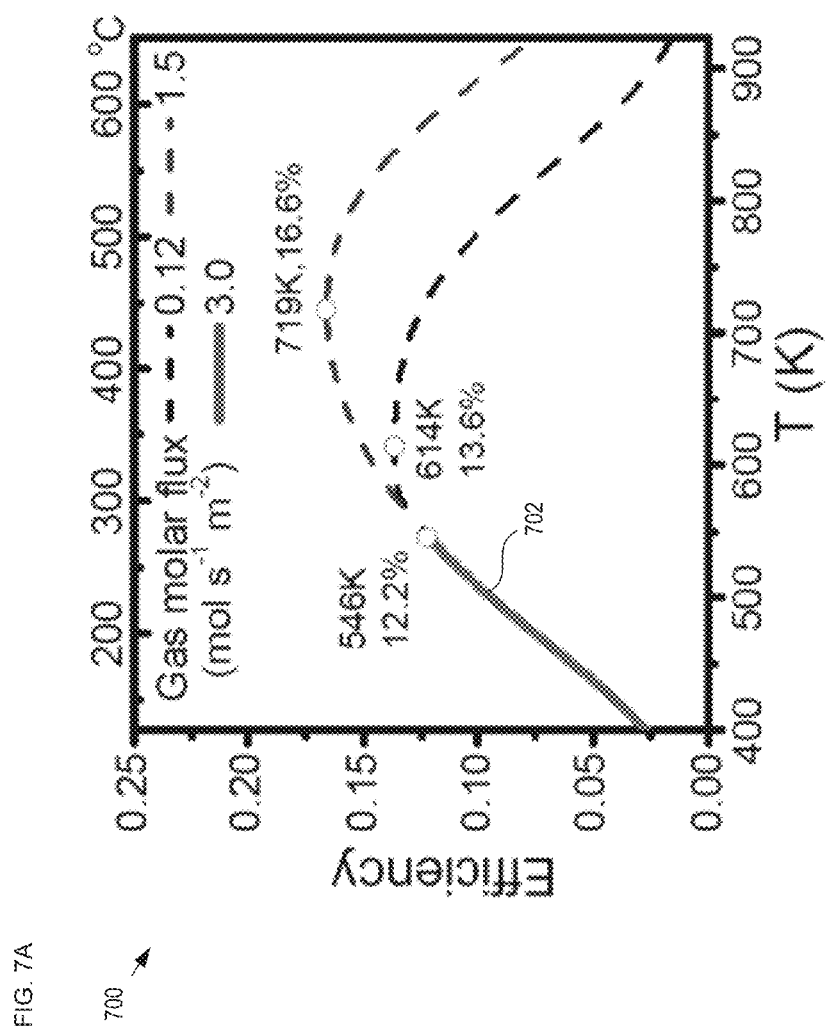
FIG. 7A depicts a plot of PEC efficiency as a function of temperature for various flow rates.

FIG. 7A depicts a plot of PEC efficiency as a function of temperature for various flow rates. Plot 700 shows that efficiency trends identically with temperature regardless of the flow rate. However, the maximum efficiency first increases at low flow rates, then plateaus, and finally falls. The maximum efficiency drops sharply at high flow rates because the temperature required for attaining the optimal efficiency can no longer be reached at the given solar flux.

Figure 7B:
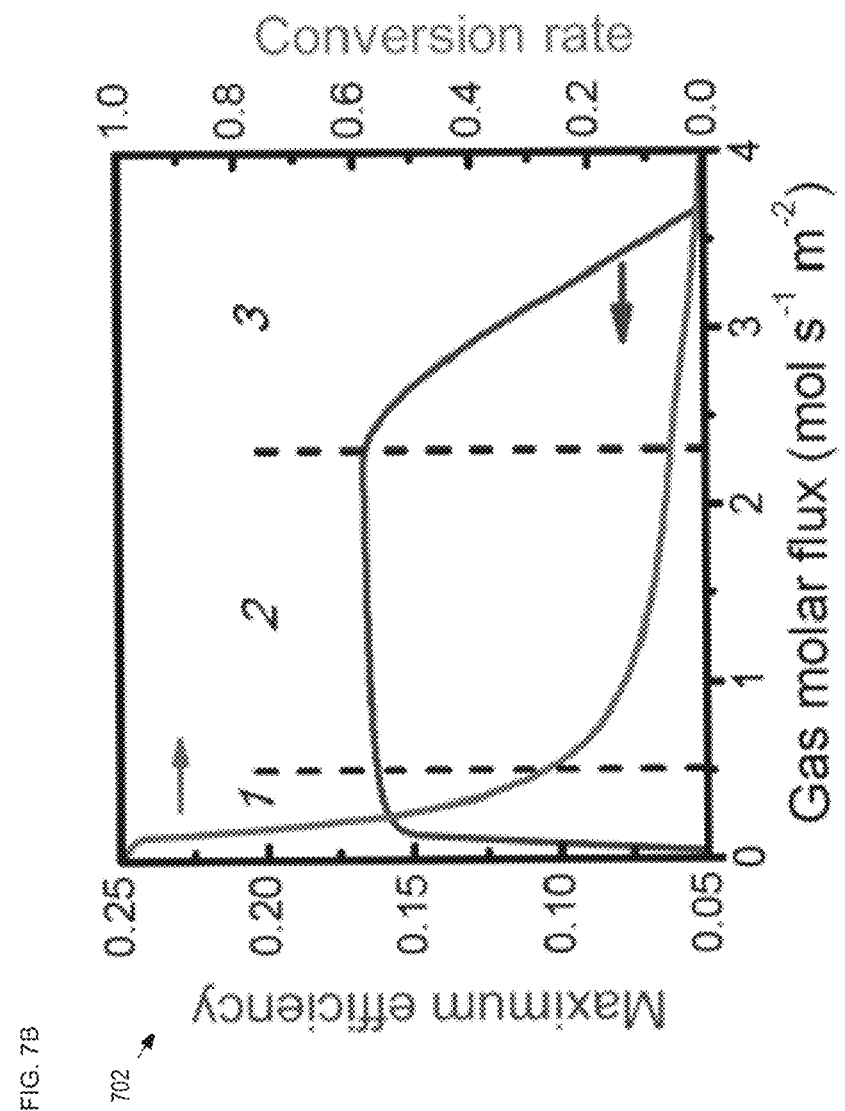
FIG. 7B depicts the maximum efficiency and corresponding conversion rate as a function of gas flow rate.

FIG. 7B depicts the maximum efficiency and corresponding conversion rate as a function of gas flow rate. Plot 702 directly evinces the efficiency trend with flow rate, where the maximum efficiency and the $H_2O$-to-$H_2$ conversion rate are shown as a function of flow rate. At low flow rates (regime 1), gas-phase mass diffusion limits the solar-to-hydrogen efficiency, which increases rapidly with flow rate as the back reaction is suppressed. The gain efficiency comes at the cost of a relatively small decrease in conversion rate. In regime 2, the efficiency plateaus as the back reaction is almost entirely suppressed, while the conversion rate continues to drop. Finally, in regime 3, the maximum efficiency drops rapidly with flow rate, as the heating requirement for excess steam in the inlet exceeds the solar energy input. The optimal flow rate lies around the boundary of regime 1 and 2. For example, a 16% solar-to-hydrogen efficiency and a 54% $H_2O$-to-$H_2$ conversion rate are predicted at a flow rate of 0.25 mol $s^{-1}$ $m^{-2}$. The calculations confirm that high efficiency and reasonable conversion rate can be achieved simultaneously.

Effect of Material Properties on Efficiency

Figures 8A, 8B, 8C:
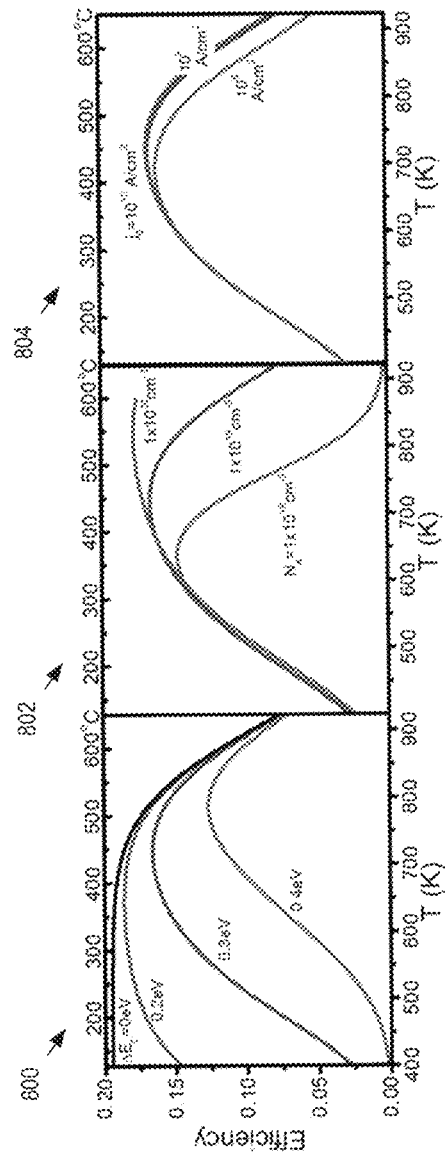
FIGS. 8A-C depict modelling results for temperature-dependent solar-to-hydrogen efficiency calculated as a function of (1) the band offset between the light absorber and the MIEC, (2) the doping level in the absorber and (3) the exchange current density of the MIEC/gas interface, respectively.

FIGS. 8A-C depict modelling results for temperature-dependent solar-to-hydrogen efficiency calculated as a function of (1) the band offset between the light absorber and the MIEC, (2) the doping level in the absorber and (3) the exchange current density of the MIEC/gas interface, respectively. The exchange current density of the MIEC/gas interface is a direct measure of the electro-catalytic activity. Band-gap was held constant at 2.0 eV, with material parameters varied one at a time.

Plot 800 shows device efficiency as a function of temperature for band offsets ranging from 0 to 0.4 eV. At larger conduction band offsets, the efficiency exhibits a clear plateau in the temperature range simulated. As discussed above, below the peak-efficiency temperature, thermionic emission across the interface limits the efficiency, whereas above the peak, rising intrinsic carrier concentration lowers the light absorber photovoltage significantly below the reversible water splitting potential. Notably, in plot 800, device efficiency at lower temperatures rises dramatically with decreasing band offset. At the same time, the maximum efficiency increases from 12% to 18% as the band offset is decreased from 0.4 to 0.2 eV, concurrent with a decrease in the peak-efficiency temperature from 800 to 650 K. This result suggests that while smaller band offset is always desired, thermal enhancement of the emission rate across the heterojunction increases the efficiency tremendously with temperature. On the other hand, the solar-to-hydrogen efficiency at the higher temperature (>800 K) is largely independent of the band offset.

For the same higher temperature range, however, the efficiency depends very strongly on the dopant concentration (plot 802). This provides direct confirmation that lower photovoltage due to the increased intrinsic carrier concentration dominates the loss mechanism. By increasing the light absorber doping level (while keeping a constant band-gap), the absorber becomes less intrinsic. This allows the PEC to run at higher temperature without losing photovoltage. As seen from plot 802, the peak-efficiency temperature increases with doping level, from 650 K ($N_a=10^{18}$ $cm^{-3}$) to 850 K ($N_a=10^{20}$ $cm^{-3}$). It should be noted that for band conductors like Si, carrier mobility and lifetime decreases with the doping level. In addition, recombination mechanisms, such as Auger recombination, may become significant. Nevertheless, preliminary analysis confirms that Auger recombination is less important than surface recombination in thin-film and nanostructured devices.

Finally, plot 804 shows that the MIEC/gas exchange current density has a negligible effect on the efficiency at most temperatures. This confirms the earlier calculation that the surface reaction at the MIEC/gas does not limit the solar-to-hydrogen efficiency. As mentioned above, this result contrasts sharply with conventional room-temperature PEC where the overpotential due to slow electro-catalysis largely determines the efficiency.

Effect of Bandgap with Other Material Properties

Figure 9:
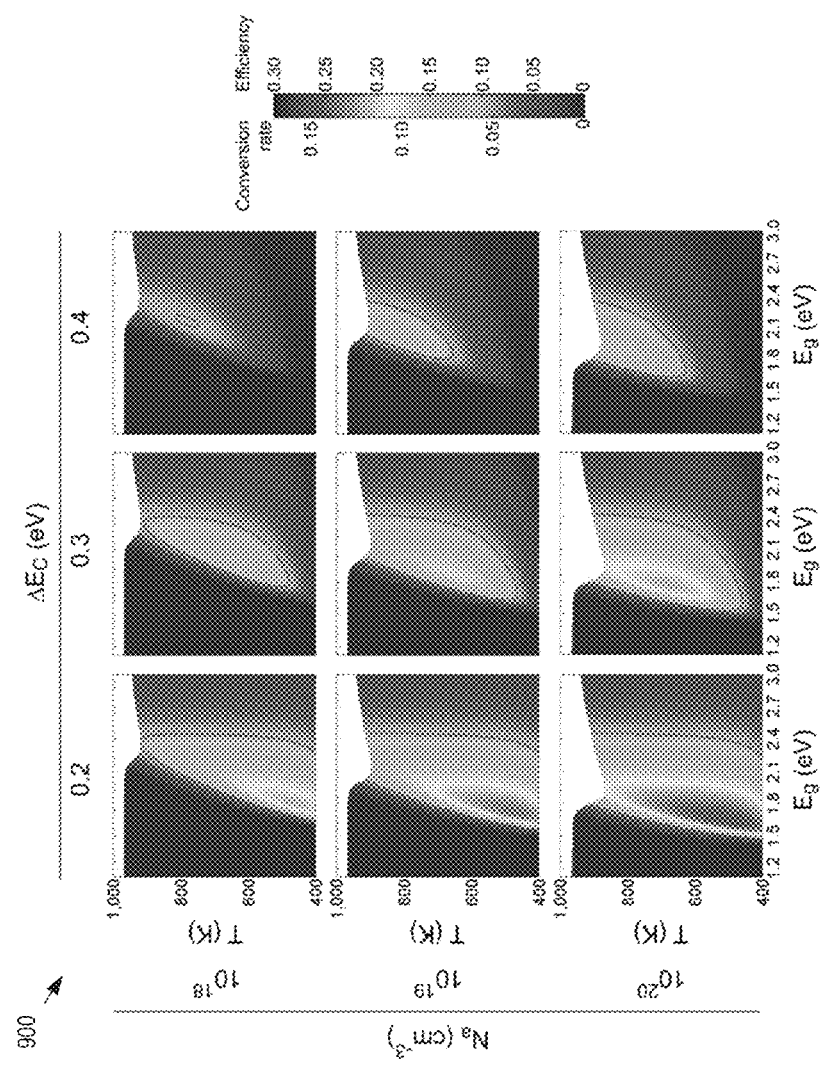
FIG. 9 depicts parametric analysis of the solar-to-hydrogen efficiency and $H_2O$-to-$H_2$ conversion rate as a function of temperature and bandgap for different band offsets and doping levels.

FIG. 9 depicts parametric analysis of the solar-to-hydrogen efficiency and $H_2O$-to-$H_2$ conversion rate as a function of temperature and bandgap for different band offsets and doping levels. Plot 900 is based on a solar concentration of 200 suns.

The light absorber band-gap is another key material parameter. Because the effect of band-gap on the light absorber/MIEC heterojunction is strongly coupled with the doping level and the conduction band offset, parametric efficiency analysis is carried out on these three material properties. The color map plots in FIG. 9 shows the temperature-dependent device efficiency and $H_2O$-to-$H_2$ conversion rate (see scale bar). The white area in the plot indicates unreachable temperature region due to the total energy balance constraint set by Eq. 11.

With the band-gap less than 1.4 eV, the solar-to-hydrogen efficiency is almost zero at room temperature due to the large overpotential; the efficiency remains essentially at zero even at higher temperatures, due to the large dark current. At very large band-gaps (>~2.5 eV), the efficiency is also negligible due to the low flux of above-band-gap photons. For the intermediate band-gaps between 1.7 and 2.2 eV, with $N_a=10^{19}$ $cm^{-3}$ and $\Delta E_c=0.3$ eV, our model predict solar-to-hydrogen efficiencies between 13.5% (at 550 K and 830 K) and 17.7% (at 640 K), with $H_2O$-to-$H_2$ conversion between 7.7 and 10%. Conditions giving solar-to-hydrogen efficiency greater than 10% are enclosed by the dashed lines in plot 900.

With smaller band-gap light absorbers, the peak efficiency shifts towards lower temperature. This finding is consistent with the fact that high intrinsic carrier concentration is the dominant photovoltage loss mechanism in narrow band-gap light absorbers. Likewise, the efficiency of photoelectrodes with smaller band-gap light absorber is more sensitive to the doping level, also evident in plot 900. For absorber with larger band-gaps, in contrast, the efficiency remains nearly constant with doping. Finally, the efficiency is sensitive to the band offset only at lower temperatures. This result is consistent with our expectation that at higher temperatures, thermal energy provides sufficient energy to overcome an uphill band offset at the heterojunction. For example, even for a 0.4 eV uphill band offset, a 16% solar-to-hydrogen efficiency is achieved at a band-gap of 1.9 eV and a doping level of $10^{20}$ $cm^{-3}$.

Overall, we find that the optimal heterojunction should exhibit the following properties: the light absorber should have a band-gap at around 2 eV with moderate doping, and there should be an asymmetric band offset between the light absorber and the MIEC material with the minority carrier band offset less than 0.4 eV.

Heterojunction photoelectrodes comprising a semiconductor light absorber and a mixed ionic and electronic conductor provide an elegant path towards more efficient hydrogen production at elevated temperatures. By operating at several hundreds of degree Celsius with concentrated sunlight, PECs in accordance with the present disclosure recover thermal energy intrinsically that would otherwise be lost, and utilizes it to enhance the rate of electron transfer at the heterojunction and electro-catalysis at the MIEC/gas interface. Detailed-balance simulation confirms that the optimal temperature for intermediate band-gap light absorbers is significantly above ambient. One key toward improving the solar-to-hydrogen efficiency of photoelectrodes in accordance with the present disclosure is the selection of an intermediate band-gap absorber (between 1.7 and 2.2 eV) such that the intrinsic carrier concentration is reduced at elevated temperature, and achieving a reasonable band alignment between the light absorber and the MIEC (for example, less than a 0.4 eV uphill barrier).

Although the PEC has been described in terms of illustrative embodiments, it is not limited thereto. Rather, the appended claims should be construed broadly to include other variants and embodiments of same, which may be made by those skilled in the art without departing from the scope and range of equivalents of the PEC.

What is claimed is:

1. A photoelectrochemical cell (PEC) comprising:
a semiconductor light absorber; and
a mixed ionic and electronic conducting (MIEC) oxide disposed over the semiconductor light absorber;
wherein photons pass through the MIEC oxide prior to absorption by the semiconductor light absorber;
wherein the MIEC oxide and the semiconductor light absorber define a heterojunction; and
wherein the photons absorbed by the semiconductor light absorber generate electrons in the semiconductor light absorber.

2. The PEC of claim 1, wherein the MIEC oxide comprises an n-type layer or film and the semiconductor light absorber comprises p-type layer or film.

3. The PEC of claim 1, wherein the heterojunction forms a photocathode.

4. The PEC of claim 3, wherein the photocathode is oxygen-ion-conducting.

5. The PEC of claim 3, further comprising an anode and an electrolyte disposed between the photocathode and the anode.

6. The PEC of claim 1, wherein the heterojunction forms a photoanode.

7. The PEC of claim 1, wherein the photoanode is proton-conducting.

8. The PEC of claim 1, wherein the MIEC oxide comprises a material selected from the group consisting of $BaZrO_3$, $CeO_2$, and perovskite oxides.

9. The PEC of claim 1, wherein the MIEC oxide comprises Sm-doped $CeO_2$.

10. The PEC of claim 1, wherein the MIEC oxide is operative as an ionic conductor.

11. The PEC of claim 1, wherein the heterojunction defined by the MIEC oxide and the semiconductor light absorber enables PEC operation at temperatures within the range of 673 degrees K to 973 degrees K.

12. The PEC of claim 1, wherein the semiconductor light absorber has band-gap between 1.7 and 2.2 eV.

13. The PEC of claim 1, wherein the semiconductor light absorber has a band-gap of 2.0 eV.

14. The PEC of claim 13, wherein the semiconductor light absorber has an uphill band offset of 0.3 eV.

15. The PEC of claim 1, wherein the MIEC oxide has a band-gap of at least 3.5 eV.

16. A method for dissociating water comprising:
providing a PEC comprising a photocathode formed by an MIEC oxide, a semiconductor light absorber, and an anode;
locating the PEC in a gas environment such that (1) the MIEC oxide and gas environment collectively define an MIEC oxide/gas interface and (2) the anode and gas environment collectively define an anode/gas interface;
absorbing photons, that pass through the MIEC oxide, with the semiconductor light absorber;
generating electrons and holes with the semiconductor light absorber in response to the absorption of the photons by the semiconductor light absorber, the electrons emitting into the MIEC oxide and the holes migrating to the anode;
combining the electrons with water molecules at the MIEC oxide/gas interface to generate hydrogen molecules and oxygen ions; and
reacting the oxygen ions with the holes at the anode/gas interface to produce oxygen molecules.

17. The method of claim 16, wherein the hydrogen molecules diffuse away from the MIEC/gas interface.

18. The method of claim 16, wherein the MIEC oxide provides a path for the oxygen ions, to the holes at the anode/gas interface.

19. The method of claim 16, wherein the photons have an energy greater than the bandgap of the semiconductor light absorber.

20. The method of claim 16, wherein the MIEC oxide provides a path for the electrons, to the MIEC oxide/gas interface.

* * * * *